United States Patent [19]
Morrell

[11] 3,844,530
[45] Oct. 29, 1974

[54] VALVE FITTING WITH VALVE ACTUATING SEALING MEANS

[76] Inventor: Albert E. Morrell, 633 Alameda De Las Pulgas, Redwood City, Calif. 94061

[22] Filed: Feb. 7, 1973

[21] Appl. No.: 330,321

[52] U.S. Cl. .............................. 251/149.6, 137/233
[51] Int. Cl. ......................... F16l 37/10, F16l 37/28
[58] Field of Search .......... 251/149.4, 149.6, 149.7; 137/231, 232, 233

[56] References Cited
UNITED STATES PATENTS
| | | | |
|---|---|---|---|
| 1,672,755 | 6/1928 | Englebert | 251/149.7 X |
| 2,424,727 | 4/1944 | Wenk | 285/348 X |
| 2,881,011 | 4/1959 | Goughlin | 251/149.4 X |
| 2,896,971 | 7/1959 | Kolar | 251/149.7 |
| 3,339,883 | 9/1967 | Drake | 251/149.4 |
| 3,592,439 | 7/1971 | Ritchie, Jr. | 251/149.6 |

*Primary Examiner*—William R. Cline

[57] ABSTRACT

A flare fitting assembly is described comprising a pair of flare fittings, at least one of which is threadably fitted with a Schrader-type valve, and a separable Schrader-type valve actuating member. The valve actuating member is provided with a central receiving cup for releasably capturing the end of a valve stem extending from the valve. The actuating member serves to depress the valve stem and open the valve as the fittings are coupled together. The central receiving cup of the member serves to maintain the member axially aligned with respect to the axis of the fittings and releasably retain the member on the stem when the fittings are decoupled.

3 Claims, 3 Drawing Figures

PATENTED OCT 29 1974 3,844,530
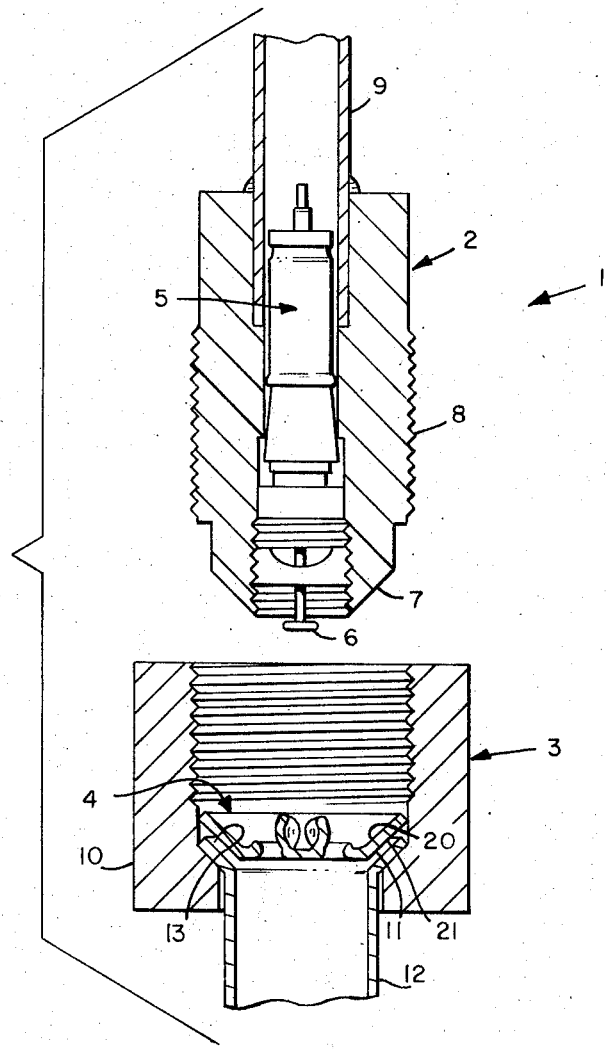
FIG. 1
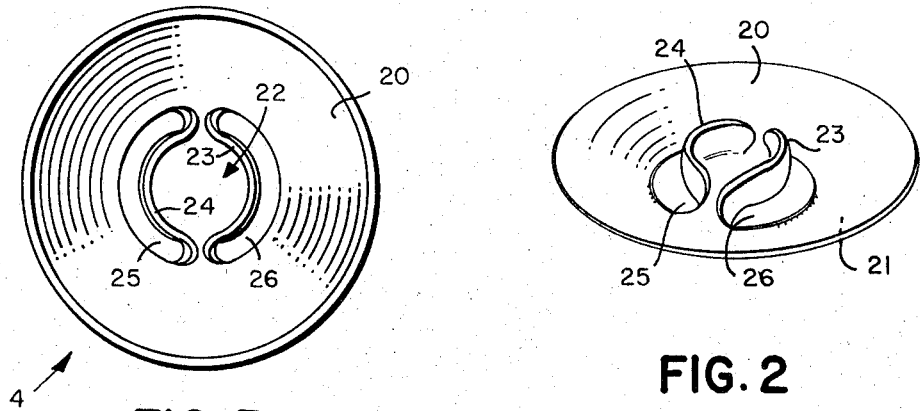
FIG. 3
FIG. 2

VALVE FITTING WITH VALVE ACTUATING SEALING MEANS

BACKGROUND OF THE INVENTION

The present invention relates in general to fittings, and in particular to valve fittings, for use in systems for coupling equipment to fluid and gas lines under pressure. Presently, when equipment is removed for repair or replacement from a system under pressure using conventional fittings and seals, it is necessary to relieve the pressure from the lines to prevent uncontrolled loss of fluid or gas. When the equipment is reinstalled, the system must be recharged. This is time consuming and hence costly.

To avoid purging and thereafter recharging the system, a practice of pinching a line closed has been adopted by personnel servicing equipment using malleable lines, such as copper tubing. Once the equipment is installed, the line is "popped" open by a further pinching of the sides of the tube. This practice is detrimental to the tubing and may result in premature failure of the tubing as by cracking or splitting at the point where the tubing is pinched.

Conventional fittings are usually coupled together with a flare or an intermediate sealing member of soft material, such as copper. The flare or sealing member is typically an annular ring having a concave and a convex surface corresponding to the concave and convex surfaces of the female and male portions of the fittings, respectively. This annular ring has no provision for operating a Schrader-type valve should it be desired to incorporate one in the connection as a permanent fixture. The present use of the valve is limited to nonpermanent service connections. The use of the present invention with a Schrader-type valve makes possible the use of any flared connection as a stop valve in a permanent installation.

SUMMARY OF THE INVENTION

To overcome the aforementioned disadvantages of conventional fittings, an object of the present invention is an improved male and female flare fitting assembly for use in a system for coupling equipment to fluid and gas lines under pressure which permits removal of equipment from the system without the need for first purging the system of fluid and gas pressure.

In accordance with this object, a feature of the present invention is a fitting using an axially disposed resiliently biased valve. A further feature of the present invention is a valve actuating member having a means for engaging the stem of the valve for opening the valve when the male and female parts of the fitting are coupled together.

A feature of the valve actuating member is a means for maintaining the member in axial alignment in the fitting between its male and female parts and for insuring a good and proper seal between the parts.

In accordance with the above objects and features of the present invention there is provided an annular valve actuating member. The valve actuating member is provided with an axially disposed extension or cup which engages the valve stem of the valve. The cup, in addition to opening the valve when the male and female parts of the fitting are coupled, serves also to maintain the valve actuating member in axial alignment regardless of the attitude of the fitting.

DESCRIPTION OF THE DRAWINGS

These and other objects, features and advantages of the present invention will be apparent from the following detailed description of the accompanying drawing in which, FIG. 1 is an elevation view in cross-section of a fitting incorporating the valve actuating sealing member of the present invention.

FIG. 2 is a perspective view of the sealing member of FIG. 1.

FIG. 3 is a plan view of the sealing member of FIG. 2.

DETAILED DESCRIPTION

Referring to FIG. 1, there is provided a valve fitting assembly 1 having a male flare fitting 2, a female flare fitting 3 and a valve actuating member 4 located between fittings 2 and 3. Fittings 2 and 3 are illustrated as terminating lines 9 and 12 respectively; however, it is understood that each of the fittings may terminate any passageway in any well known manner.

Fitting 2 is provided with a resiliently biased valve 5 having a valve stem 6. Valve 5 is axially disposed within fitting 2 and is normally biased closed by an internal spring (not shown). Valve 5, commonly known as a Schrader-type valve, is of conventional construction. Such valves are typically used, for example, as access valves in such applications as automobile and bicycle inner tubes and as charging and evacuation valves in refrigeration systems. Fitting 2 is further provided at its end with a beveled surface 7 and threads 8 for coupling to female fitting 3.

Female fitting 3 is provided with a threaded swivel nut 10 which is captured on the end of fitting 3 by a flared portion 11 which terminates line 12 or other female flare fitting. Portion 11 has a concave surface 13 which corresponds to the beveled surface 7 of fitting 2. The corresponding mating surfaces 7 and 13 serve to provide a good seal between fittings 2 and 3 when the fittings are coupled together with valve actuating member 4 as hereinafter described.

As shown in more detail in FIGS. 2 and 3, valve actuating member 4 is disposed between fittings 2 and 3 and is provided with a concave surface 20 corresponding to beveled surface 7 of fitting 2 and a convex surface 21 corresponding to surface 13 of flared portion 11 of fitting 3. Extending interiorly of concave surface 20 is an axially disposed member 22 which is positioned to engage stem 6 of valve 5 when fittings 2 and 3 are coupled together.

Member 22 is further provided with a pair of upstanding walls 23 and 24 which form a cup-shaped receptacle which is adapted to capture the end of stem 6 to maintain valve actuating member 4 in axial alignment and to retain member 4 on stem 6, as by friction, when fittings 2 and 3 are coupled. The retention of member 4 on stem 6 enables the installer to make the necessary connection of the fittings 2 and 3 without the necessity for maintaining the fittings in any particular position. Furthermore, fittings 2 and 3 may be in any attitude when coupled and in nearly inaccessible positions wherein only one hand is free to make the connection. A pair of passageways 25 and 26 are further provided about walls 23 and 24 for providing fluid and gas communication through member 4 when valve 5 is opened as hereinafter described.

Valve actuating member 4 is typically made of a malleable material, such as copper.

In use, member 4 is placed on valve stem 6 and fittings 2 and 3 threaded together. As the fittings are joined, member 22 depresses valve stem 6 and the valve is opened. Fluid and gas communication is then permanently established between fittings 2 and 3 through member 4. When, conversely, fittings 2 and 3 are decoupled, valve 5 automatically closes to prevent loss of fluid and gas from the line terminated by the fitting 2.

It is apparent from the foregoing that fluid or gas pressure in a passageway which is terminated by fitting 2 will be preserved and that there is therefore no need to purge a system to prevent uncontrolled loss of fluid or gas pressure therefrom when decoupling from the line.

While described for use with a valve in a male fitting, it is also understood that valve actuating member 4 of the present invention may easily be adapted for opening a valve located in a female fitting by extending member 22 and walls 23 and 24 from the convex surface 21 of the member. Similarly, both fittings 2 and 3 together with valve actuating member 4 may be included as a part of a T-shaped or L-shaped fitting or any combination thereof. Likewise, their use is not intended to be limited in any manner to use as a straight fitting or as a fitting terminating a line as described herein but on the contrary, they may be used wherever conventional flare fittings are presently used.

These and other modifications will be apparent from the preferred embodiment described herein without departing from the scope of the present invention which is intended to be limited only as hereinafter provided in the appended claims.

What is claimed is:

1. A flare fitting assembly comprising:
   a first flare fitting;
   a second flare fitting;
   a resiliently biased valve having a movable valve stem with a free end axially disposed in one of said flare fittings;
   a means for coupling together said first and said second flare fittings;
   a means removably coupled to said free end of said valve stem for actuating said valve when said first and said second flare fittings are coupled together wherein said valve actuating means comprises a cup-shaped extension for removably receiving said free end of said valve stem and further comprising:
   a passageway adjacent said cup-shaped extension for providing fluid and gas communication through said valve actuating means wherein said cup-shaped extension is formed for releasably capturing said free end of said movable valve stem for retaining said valve actuating means on said movable stem when said first and said second flare fittings are decoupled.

2. A fitting assembly according to claim 1 wherein one of said first and said second flare fittings is provided with a beveled convex surface and the other of said flare fittings is provided with a corresponding flared concave surface, said valve actuating means is provided with a concave surface corresponding to said beveled surface and a convex surface corresponding to said flared surface and wherein said cup-shaped extension extends from at least one of said concave and convex surfaces of said valve actuating means.

3. For use in actuating a valve threadably engaged in a flare fitting, with said valve as an integral part thereof, a valve actuating member comprising:
   an annular member having a fluid passageway therethrough; and
   a cup-shaped receptical axially disposed in the interior of said annular member for removably receiving said valve stem, said cup-shaped receptacle being formed to capture said valve stem for removably retaining said annular member on said valve stem.

* * * * *